No. 859,195. PATENTED JULY 9, 1907.
B. BÖHME.
CUTTING MACHINE.
APPLICATION FILED NOV. 16, 1906.

Witnesses.

Inventor.
Bruno Böhme.

UNITED STATES PATENT OFFICE.

BRUNO BÖHME, OF DRESDEN, GERMANY.

CUTTING-MACHINE.

No. 859,195.  Specification of Letters Patent.  Patented July 9, 1907.

Application filed November 16, 1906. Serial No. 343,745.

*To all whom it may concern:*

Be it known that I, BRUNO BÖHME, paper-cutter, a subject of the German Emperor, and resident of Dresden, Germany, have invented new and useful Improvements in and Relating to Cutting-Machines, of which the following is a specification.

The subject of the present invention is a device to be fitted to cutting machines, and which is adapted to allow any number of uniform strips, labels, and the like to be cut from paper, cork plates, silks and the like.

The feature of the invention on the one hand is that a plate which is immediately in front of the cutting blade and against which rests the front edges of the material to be cut, is so mounted as to be able to be turned over in an acute angle, and on the other hand the whole device can be moved backwards and forwards by means of a laterally movable bar.

Figure 1:
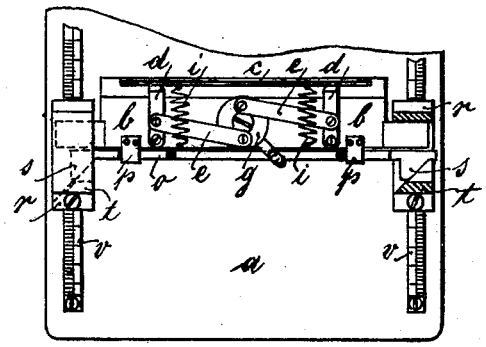
Figure 2:
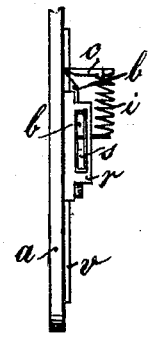
Figure 3:
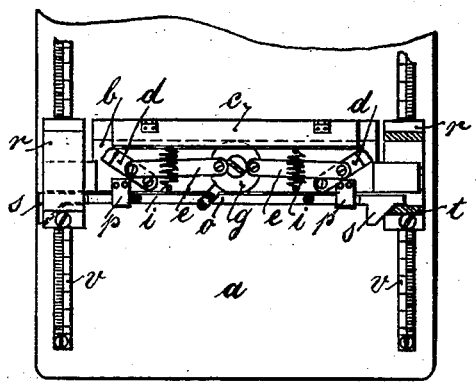
Figure 4:
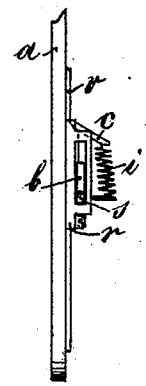
Figure 5:
Figure 6:
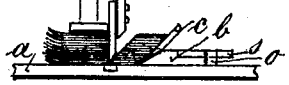

In the accompanying drawing Figure 1 is a plan view of the device. Fig. 2 is a side view of Fig. 1. Fig. 3 is a plan of the device. Fig. 4 is a side view of Fig. 3. Fig. 5 is a rear view of the device. Fig. 6 is a mode of operation of the plate for supporting the cut material; this plate we will call the support plate.

Screwed to the table $a$ of the paper cutting machine are scales $v$ on which hollow slides $r$ slide or may be fixed to the same by means of screws or the like. The plate $b$ slides in the hollow slide $r$. The support plate $c$ is hinged to the fore broad side of said plate $b$. The latter is further furnished with adjustable bars $d$ and an adjustable disk $g$ furnished with a handle. This disk $g$ is so connected to the bars $d$ by means of arms $e$, that a rotation of the disk $g$ either moves the rods $d$ towards or away from each other.

The object of this mechanism is to place the support plate $c$, which is held under tension by the springs $i$, in a vertical or slanting position as shown in Fig. 3 and 4.

In order to be able to move the whole device backwards, the plate $b$ is provided with sockets $p$ in which the rod $o$ is free to slide laterally. This rod $o$ is furnished at both ends with a nose $s$, the outer slanting face of which slides up or down the corresponding shaped side of the block $t$ screwed in the hollow slide $r$.

It follows therefore that by sliding said rod $o$ to the right hand side, the whole device is moved forwards, and by moving the rod $o$ in the opposite direction the device moves backwards.

The turning support plate $c$ allows any number of strips of uniform breadth to be continually cut without having to reset the size, and strips of the least possible width do not fall but rest up against the slanting support plate $c$. Thus the tedious job of collecting the strips which would otherwise fall over, is obviated. Another advantage of this support plate is that the cut material yields to the penetration of the knife, consequently damages caused by jamming are prevented. One is further able to see, by turning back the support plate $c$ before cutting, if the layers of the material to be cut are in position.

The rod $o$ would be particularly useful when cutting soft material, such as foliated gold, tin foil and the like, or if the knife head projects to any extent, *i. e.* if the knife is worn down, as the space between the device and the knife may be increased by means of the shifting rod $o$.

Having fully described my invention, what I claim and desire to secure by Letters Patent is:

1. A device to be fitted to cutting machines, comprising, in combination the support plate ($c$) hinged to the base plate ($b$,) and held under tension by springs ($i$,) and adapted to be placed vertically to the cutting surface or in an acute angle to the same by means of an adjusting disk ($g$) provided with arms ($e$) which are connected to rods ($d$), substantially as described and shown and for the purpose set forth.

2. A device to be fitted to cutting machines comprising, in combination, the support plate ($c$) and plate ($b$) which slides in the slide ($r$) which is adjustable on the cutting table, and the support plate ($c$) and plate ($b$) adapted to be moved forwards and backwards by laterally sliding the rod $o$ furnished at both ends with noses ($s$) substantially as described and shown and for the purpose set forth.

In testimony whereof I have hereunto set my hand in the presence of two subscribing witnesses.

BRUNO BÖHME.

Witnesses:
 M. HOLLAND,
 PAUL ARRAS.